July 11, 1967    A. J. MORRIS    3,330,474
AXIAL-FLOW BLOWERS
Filed Dec. 8, 1965    3 Sheets-Sheet 1
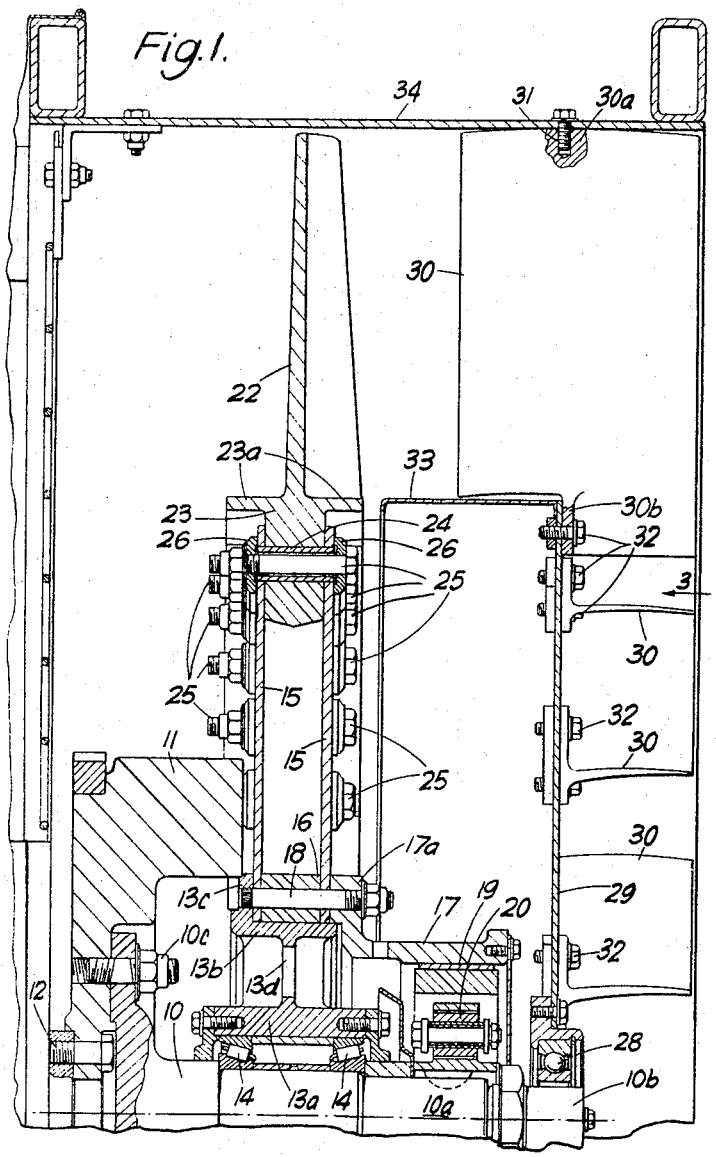
INVENTOR
Alberto J. Morris

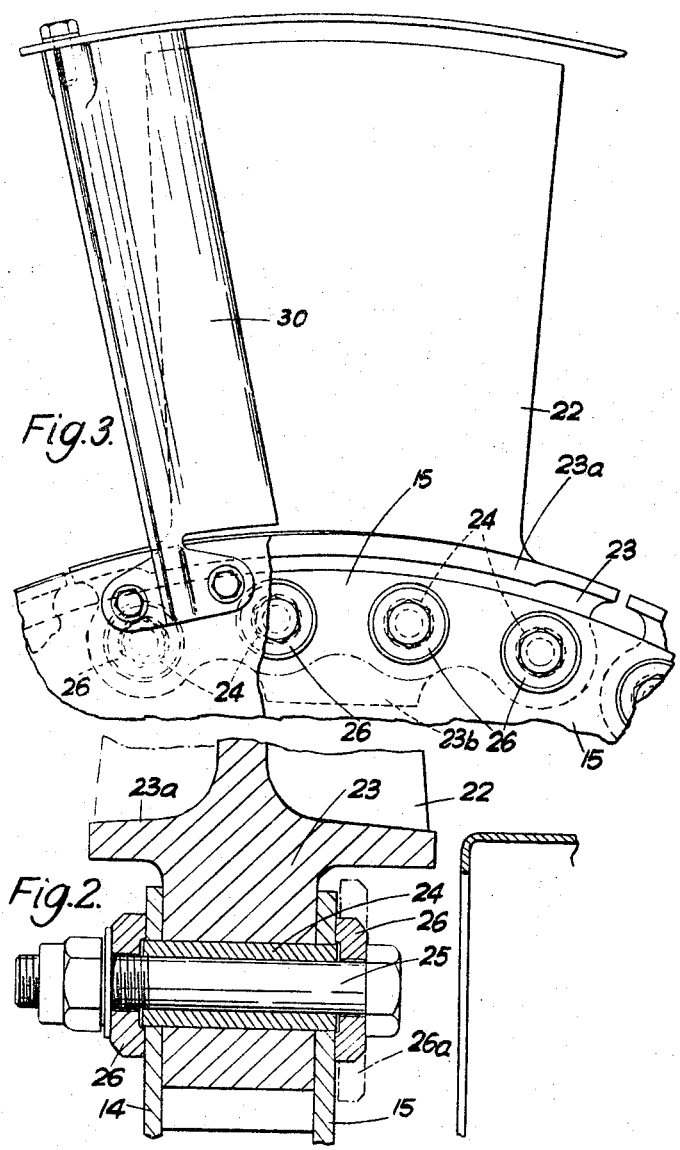

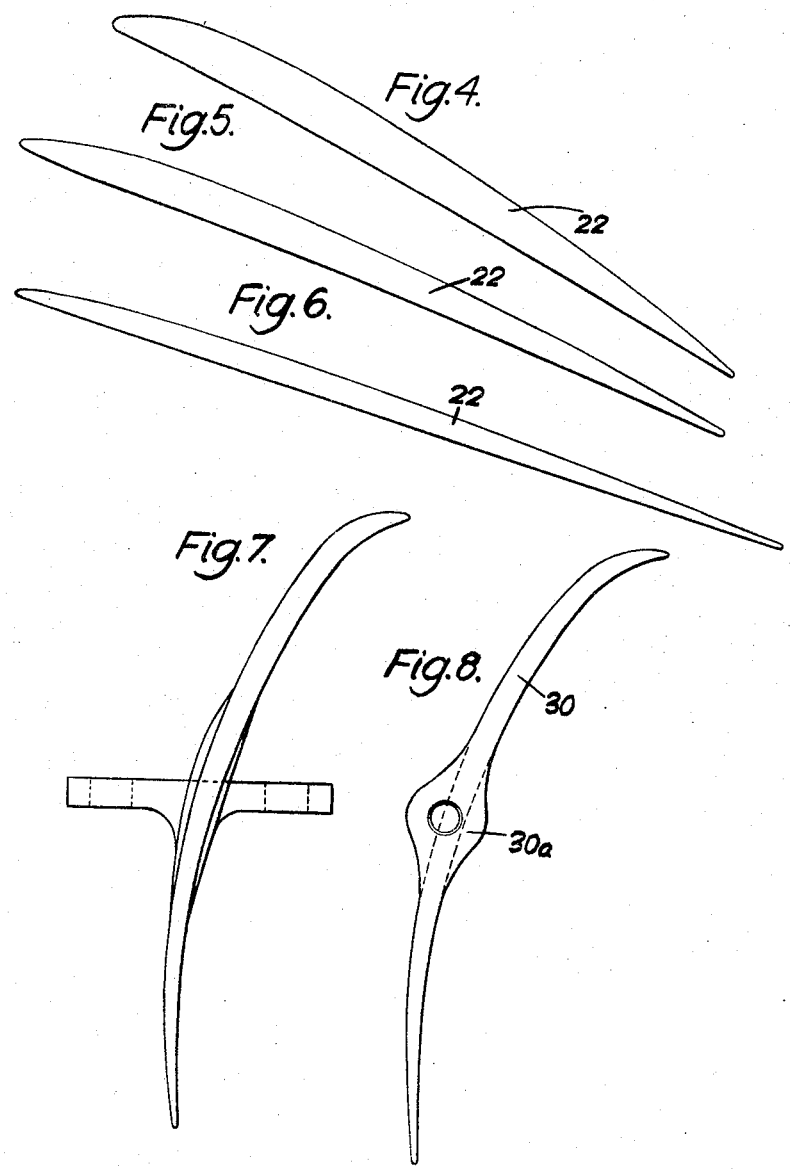

United States Patent Office 3,330,474
Patented July 11, 1967

3,330,474
AXIAL-FLOW BLOWERS
Alberto Jorge Morris, Dursley, England, assignor to R. A. Lister & Company Limited, Dursley, England a British company
Filed Dec. 8, 1965, Ser. No. 512,444
10 Claims. (Cl. 230—120)

This invention comprises improvements in or relating to axial-flow blowers for moving gases which blower is of the kind comprising an impeller having a number of radial blades mounted at the periphery of a disc structure.

According to this invention, in an impeller for an axial-flow blower, the disc structure comprises an annular hub adapted to allow mounting of the impeller on a driving shaft therefor and a pair of flat annular discs secured in axially-spaced relation on the hub, and each of the blades has a circumferentially-extending mounting root which lies between the peripheries of the discs, the roots together forming a substantially complete annulus radially spaced from the hub, there being means clamping the disc peripheries axially on to the roots and means retaining the blades radially which is not loaded by the clamping means.

The invention enables a robust but economic impeller to be produced, for instance for use in air moving apparatus like that described in our co-pending British patent application No. 40,493/64 in which the blower impeller is mounted directly on the crank shaft extension of a reciprocating internal combustion engine.

According to a feature of this invention, the means for retaining the blades radially in position may be hollow dowels which extend through holes in the roots and have their ends in holes in the discs, and the clamping means comprise bolts or the like extending through the dowels and through washers disposed against the external surfaces of the discs but having axial clearance from the dowels. The washers may be used for balancing the rotor; for instance washers of differing weights may be used at determined points around the periphery.

When as above mentioned the impeller is mounted on an extension of the crank shaft of a reciprocating engine, there may be a clutch between the shaft extension and the hub adapted to come into operation automatically to start transmitting a drive to the impeller at a rotational speed well below the engine idling speed. In this case the hub may be supported by bearings on the shaft extension, the clutch driving and driven parts being mounted on the shaft extension and an extension of the hub respectively, the extension of the hub also being used, if desired, as a clamping ring, the discs and a spaced ring for their centres being sandwiched between the clamping ring and a flange on the hub.

An axial-flow blower embodying the above and other features of invention will now be described with reference to the accompanying drawings in which:

FIGURE 1 is a side view through the blower, parts being in section,

FIGURE 2 is a detail of FIGURE 1,

FIGURE 3 is a view in the direction of arrow 3 on FIGURE 1 showing further details, FIGURES 4 to 6 are typical sections of the rotor blades, and FIGURES 7 and 8 are typical sections of associated outlet straightener vanes.

The blower shown is constructed to be driven by a reciprocating internal combustion engine of which the crank shaft has a stub crank shaft extension 10 (FIGURE 1) to carry the blower impeller. This stub 10 is secured by studs 10c to a flywheel 11 which in turn is secured by bolts 12 to the crank shaft proper.

The impeller comprises an annular hub of H-section having an inner flanging 13a which provides a housing for bearings 14 by which the hub is rotatively mounted on the stub shaft 10. The flanging 13a is joined by a radial web 13d to outer flanging 13b which provides a location for a pair of like, plane, annular discs 15 and a spacer ring 16 for their centres. The parts 15, 16 are clamped by bolts 18 between a radial flange 13c on the hub and a radial flange 17a on a separate hub extension 17 which acts as a clamping ring.

The impeller further comprises a number of radial blades 22 (FIGURES 1 to 3) whereof typical root, median and tip sections are shown in FIGURES 4 to 6 respectively, each of which has a root 23 by which the blade is mounted on the impeller.

Each root 23 is circumferentially extensive (FIGURE 3) and the roots together form a substantially complete annulus. The roots 23 have shroud-forming flanges 23a from which the blade 22 projects.

Each root 23 is located radially between the peripheries of the discs 15 by four hollow dowels 24 (FIGURES 1 to 3) which extend through holes in the roots and engage by their ends in holes in the disc peripheries.

The discs 15 are clamped axially onto the roots 23 by means including clamping nuts and bolts 25, which extend with clearance through the dowels 24, and washers 26 which are recessed on the sides against the discs 15 so as to be clear of the dowel ends and in contact with the discs only. Some of the washers may be oversize, as indicated at 26a, these being located at determined points for impeller balancing purposes.

The roots 23 may have portions 23b (FIGURE 3) which can be machined away for initial weight adjustment.

The hub extension 17 houses an automatically engaging clutch 19, 20 mounted on a part 10a of the stub shaft 10. The cluth starts driving the impeller when the engine revolutions are well below idling, so that there is no clutch slip at any point of the operational speed range of the engine.

The stub shaft has an axial prolongation 10b beyond the part 10a and this prolongation 10b projects into the inner race of a ball bearing 28 which is centrally mounted in a diaphragm 29. The prolongation 10b has enough clearance from the inner race to prevent the prolongation touching the race during normal running. The diaphragm 29 is centred by a series of outlet straightener vanes 30 in an outer shroud 34 which may form part of a nacelle housing the blower and its driving engine. The vanes 30 are secured at their outer ends to the shroud by screws 31 which enter swellings 30a (FIGURES 1, 3 and 8) mid-way between the leading and trailing edges. Each vane 30 has at its inner end a pair of ears 30b (FIGURES 1, 3 and 7) which are mid-way between its leading and trailing edges and the vanes are secured by screws 32 to the downstream side of the diaphragm 29. The diaphragm also supports at its periphery an inner annular shroud 33 for the vanes 30 which project axially downstream beyond the shroud 33 and radially inwards beyond it over the downstream portions.

It will be noticed from FIGURE 1, that the radial web 13d of the impeller hub has holes in it aligned with the studs 10c to give access to these, so that the hub and bearings may be sub-assembled on the stub shaft 10 before bolting the completed assembly on the engine flywheel 11.

I claim:

1. An impeller for an axial flow blower comprising: an annular hub for mounting on a driving shaft for the impeller; a pair of flat annular discs secured in axially spaced relation on the hub; a number of radial impeller blades, each having a circumferentially-extending mounting root disposed between the peripheries of the disc, the roots together forming a substantially complete annulus radially spaced from the hub; means clamping the disc peripheries axially on to the roots; and means retaining the blades radially, which retaining means is not loaded by the clamping means.

2. An impeller according to claim 1, wherein the means for retaining the blades radially in position are hollow dowels which extend through holes in the roots and have their ends in holes in the discs, and the clamping means comprise bolts extending through the dowels and through washers disposed against the external surfaces of the discs but having axial clearance from the dowels.

3. An impeller according to claim 2, wherein the washers, by being given different weights, also constitute balancing weights for the impeller.

4. An impeller according to claim 1 wherein the hub has inner and outer flanging joined by a radial web, the outer flanging providing a location for the annular discs and a spacer ring for the centres of the disc, and the inner flanging having means for mounting it on a driving shaft.

5. An air blower comprising a reciprocating engine having a crank shaft; an extension of the crank shaft; and an impeller comprising an annular hub mounted on the extension of the crank shaft, a pair of flat annular disc secured in axially spaced relation on the hub, a number of radial impeller blades, each having a circumferentially-extending mounting root disposed between the peripheries of the disc, the roots together forming a substantially complete annulus radially spaced from the hub, means clamping the disc peripheries axially on to the roots, and means retaining the blades radially, which retaining means is not loaded by the clamping means.

6. An air blower according to claim 5 wherein a clutch is provided between the shaft extension and the hub which clutch is adapted to come into operation automatically to start transmitting a drive to the impeller at a rotational speed well below the engine idling speed.

7. An air blower according to claim 6 wherein the hub is supported by bearings on the shaft extension, the clutch driving and driven parts being mounted on the shaft extension and an extension of the hub respectively.

8. An air blower according to claim 7 wherein the extension of the hub also constitutes a clamping ring the disc and a spacer ring for their centres being sandwiched between the clamping ring and a flange on the hub.

9. An air blower according to claim 5 having outlet straightener vanes which support a central diaphragm within an outer shroud, the shaft extension having a prolongation into an inner race of a bearing supported by the diaphragm, there being such a clearance between the prolongation and the inner race that they do not touch in normal running.

10. An air blower according to claim 9, wherein the diaphragm has at its periphery an inner annular shroud for the inner ends of the vanes which vanes have portions projecting axially downstream beyond the inner shroud, which portions also project radially inwards beyond the shroud.

References Cited

UNITED STATES PATENTS

| 2,501,038 | 3/1950 | Fransson | 253—77 |
| 3,096,662 | 7/1963 | McRae | 123—41.11 |

FOREIGN PATENTS

| 672,258 | 8/1949 | Great Britain. |
| 724,281 | 2/1955 | Great Britain. |
| 728,754 | 4/1955 | Great Britain. |
| 763,261 | 12/1956 | Great Britain. |

DONLEY J. STOCKING, *Primary Examiner.*

HENRY F. RADUAZO, *Examiner.*